Patented Oct. 17, 1939

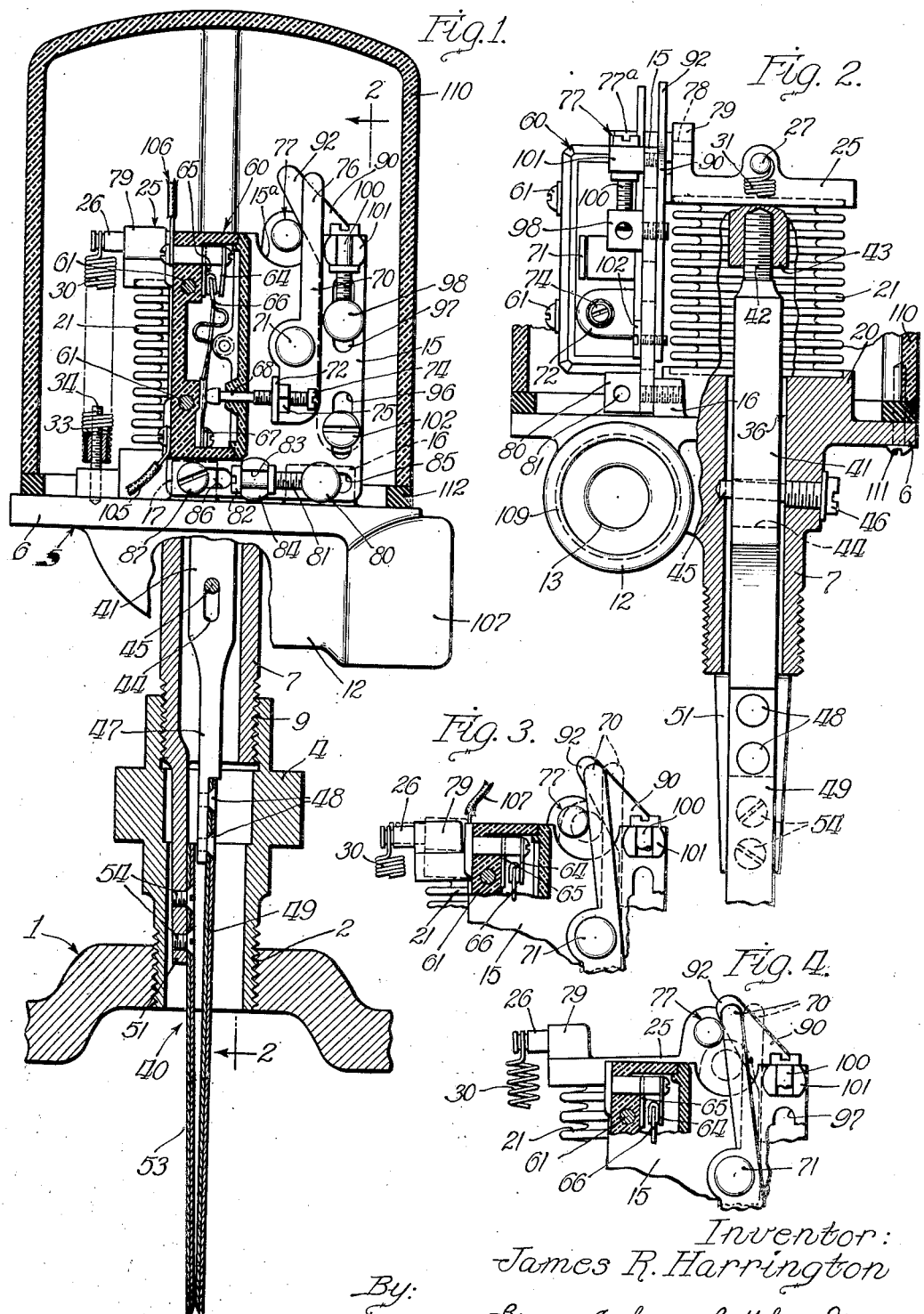

2,176,338

UNITED STATES PATENT OFFICE 2,176,338

PRESSURE AND TEMPERATURE RESPONSIVE DEVICE

James R. Harrington, Mansfield, Ohio, assignor to The Autocall Company, Shelby, Ohio, a corporation of Ohio Application January 18, 1936, Serial No. 59,797

29 Claims. (Cl. 200—83)

The present invention relates generally to pressure and temperature responsive devices and is particularly concerned with pressure and temperative sensitive means arranged to give an indication or perform a control service whenever either pressure or temperature conditions reaches a certain value.

The principal object of the present invention is the provision of a combined pressure and temperature responsive unit arranged with the pressure and temperature sensitive means operable entirely independent of one another for actuating a switch or other means. Specifically, it is an object of the present invention to provide a control unit for signaling equipment of the constant electrical supervision type in which an indication is given when either a certain temperature or a certain pressure condition exists, and another object of the present invention is to provide means whereby a single unit is adapted to be actuated by either the temperature responsive means or the pressure responsive means entirely independent of the other. Still further, another object of the present invention is to provide means including a single member acted upon by two condition responsive units entirely independent of one another so that when either of the conditions reaches a given value, the control means will be actuated, entirely independent of whether the other condition is near its critical value or remote therefrom.

More specifically, it is an object of the present invention to provide an expansible bellows having a part acted upon not only by the pressure within the bellows but also by temperature, the direction of movement imparted thereto due to pressure conditions being in a direction different from the movement imparted thereto by said temperature responsive means. Still further, another object of the present invention is the arrangement of switch mechanism to accommodate such dual movement of a shiftable part, responsive independently to two different conditions, and to be actuated when either of those conditions reaches a given value, entirely independent of the other condition.

An additional object of the present invention is the provision of a member movable in different directions in response to two separate and independent conditions, with means for transforming one of said movements into a component in the same direction as the other movement, whereby a single switch or control unit can be arranged to be actuated by movement in said last named direction and to thereby become respon- sive to the attainment of a given value in either of said conditions entirely independent of the value of the other condition.

These and other objects of the present invention will be apparent to those skilled in the art after a consideration of the following detailed description taken in conjunction with the accompanying drawing illustrating such embodiment.

Referring now to the drawing:

Figure 1 is a cross section taken substantially through the central portion of a device constructed according to the principles of the present invention;

Figure 2 is a view taken substantially along the line 2—2 of Figure 1; and

Figures 3 and 4 are fragmentary views illustrating the movement of the bellows head acting in response to temperature and pressure changes, these figures illustrating the manner in which the switch mechanism is operable by the temperature and pressure responsive means independently of one another.

Referring now more particularly to Figures 1 and 2, the reference numeral 1 indicates the casing of a transformer forming one unit of a power distribution system. As is well known, these transformers are filled with oil or other dielectric material for insulating and cooling purposes. In maintaining constant automatic electrical supervision of the elements of the power distribution system it is important to ascertain the condition of the transformer in order to be warned when a transformer has reached a predetermined high pressure or temperature condition. Upon the occurrence of failure of a transformer, either the temperature of the oil or its pressure increases to a point above its normal operating condition, and the present invention contemplates ascertaining instantly when either of these conditions approach or reach an abnormal value in order to allow taking the transformer unit out of service before serious damage or loss of life can result, which may happen if a defective transformer is left on the line until complete failure and an explosion occurs.

In applying the present invention to such a transformer, the case 1 of the latter is threaded, as at 2, to receive a fitting 4. The temperature and pressure responsive device, constituting the present invention, includes a base member 5 which has a flange 6 and an integral nipple 7 provided with external threads 9. If desired, the nipple 7 might be screwed directly into the opening 2 of the transformer casing 1. An enlarged portion 12 is formed on the base member 5 and cored, as at 13, to provide for taking out signal leads and the like.

A supporting plate 15 is adjustably fixed to boss sections 16 and 17 so as to form a rigid part thereof, and a boss 20 is provided to receive the inner end of an expansible and contractable bellows 21 sealed thereto. The outer end of the latter carries a head member 25 carrying a pair of diametrically opposed pins 26 and 27, each having a groove at its outer end to receive the upper end of a spring, the spring associated with the pin 26 being indicated in Figure 1 by the reference numeral 30 and the spring associated with the pin 27 being indicated in Figure 2 by the reference numeral 31. Both of the springs 30 and 31 are adjustably secured to the base 5 by a screw and nut arrangement shown in Figure 1, including a nut 33 carried at the lower end of the spring and adapted to be threaded onto a screw 34 carried by the base. The boss section 20 and the nipple 7 are apertured, as at 36, whereby the interior of the bellows 21 is subjected to the pressure conditions existing on the interior of the transformer case 1. Thus the bellows 21 expands axially of itself when the pressure in the transformer case 1 increases, and the springs 30 and 31 collapse the bellows upon the occurrence of a pressure decrease, the bellows 21 and associated parts thereby becoming pressure responsive means.

The temperature responsive means is indicated in Figure 1 by the reference numeral 40 and comprises an arm 41 having its outer end 42 threaded into a boss 43 formed on the bellows head 25 within the interior of the bellows 21, as best shown in Figure 2. The lever 41 is provided with a slot 44 which receives a pivot pin 45 having a head 46 that is threaded into the portion of the nipple 7 adjacent the base flange 6. The inner end of the bar or lever 41 is reduced as at 47 and has secured thereto, as by screws 48, a bimetallic element 49 which extends through the opening 2 of the transformer case and into the interior of the transformer case 1 in thermal contact with the oil or other fluid therein. The inner end of the nipple includes an arm 51 also arranged to extend to some point within the transformer case 1 and, if desired, the thermostatic element 49 may be arranged to react directly thereagainst. Preferably, however, a second bimetallic element 53 is provided and is fastened by screws 54 to the arm 51.

As best shown in Figure 1, the bimetallic members 49 and 53 are arranged to engage one another and, in response to temperature changes within the transformer case 1, to swing the lever or bar 41 about its fulcrum 45 and shift the bellows head 25 laterally. During this operation, the bellows 21 serves as a seal for this movement, thereby entirely eliminating the necessity for packing the member 41 or its equivalent. It is to be noted that the pressure and temperature responsive means act against the head member 25 in different directions; that is, the member 25 is moved axially in response to pressure changes and laterally, at substantially right angles to its first direction of movement, in response to temperature changes. By virtue of the bimetallic members 49 and 53 being in sliding contact at their inner ends and the length of the slot 45, the member 25 is permitted to move axially without being affected by the particular position which the members 49 and 53 may take, and similarly the lateral position of the member 25 is independent of whether the bellows 21 is expanded or contracted. Under a given pressure condition, the head 25 moves axially a given distance, irrespective of the temperature, and similarly, under a given temperature change, the head 25 is moved laterally to a certain point, irrespective of the pressure within the transformer case or the axial position of the head 25.

According to the principles of the present invention movement of the bellows head 25, either laterally or axially, is arranged to actuate a switch. The switch is indicated in its entirety by the reference numeral 60 and is shown as mounted by screws 61 on the supporting member 15 so as to be adjustable relative to the base 5 therewith. The switch 60 may take any conventional form but is preferably of the snap action type and is biased for movement in one direction. The particular details of the switch mechanism 60 do not per se form any part of the present invention, being of the form shown in the patent to McGall No. 1,960,020 and employing a pair of contacts 64 and 65 and a spring arm 66 secured to a third contact 67. A plunger 68 is arranged for moving the arm 66 from one position to another. The arm 66 is so arranged as to be biased for movement toward engagement with the contact 64 at all times, but in the normal position of the device the blade 66 is held against the other contact 65, as will be explained later. Any other suitable switch means may be employed where found desirable.

The switch mechanism 60 is controlled by a pivoted arm 70, which thereby forms a part of the switch mechanism. The arm 70 is pivoted on a stud 71 carried by the supporting plate 15 and has an ear 72 into which is threaded a screw 74 secured in place by a lock nut 75. The screw 74 is arranged to engage the switch plunger 68, and the switch arm 70 is extended, as at 76, so as to be engaged by an actuating or contact member 77 in the form of a roller 77a (Figure 2) carried on a pin 78 which is secured to an upstanding lug 79 formed on or secured to the head 25. The supporting plate 15 is cut away, as at 15a, to accommodate axial and lateral movement of the switch actuating member 77.

The adjusting means for shifting the position of the supporting plate 15 laterally relative to the base 5 includes a stud 80 having a threaded opening to receive the threaded end of an adjusting screw 81 having a double head 82 disposed within the slot 83 of a stud 84 carried on the plate 15, the stud 80 being threaded into the base boss 16 through a slot 85 formed in the plate 15. A second slot 86 is also formed in the plate and receives a screw 87 which is threaded into the base boss 17. When the screw 87 is tightened it serves to fix the lateral position of the supporting plate 15. By loosening the screw 87 and turning the screw 81 in one direction or the other, the plate 15 will be shifted so as to bring the switch arm 70 to the proper position, laterally of the base 5, with respect to the actuating member 77 carried on the bellows head 25.

As the temperature of the contents of the transformer case 1 rises, the bimetallic elements 49 and 53, reacting against one another at the inner ends, cause the bar or lever 41 to swing counterclockwise, as viewed in Figure 1, about the pivot pin 45, causing the bellows head member 25 to shift to the left, carrying with it the adjusting or contact member 77. As the member 77 moves to the left, the switch operating lever 70 is caused to follow the same, since the bias of the switch lever 66 causes the plunger 68 to exert a constant force on the screw 74 carried by the inner end of the lever 70. This then permits the blade 66 to swing into engagement with the contact 64, as shown in Figures 3 and 4. In both Figures 3 and 4 the original position of the actuating member 77 and the arm 70, the position shown in Figure 1, is indicated in dotted lines. Figure 3 illustrates the position, considerably exaggerated for purposes of illustration, which the parts take when the pressure remains the same but the temperature within the transformer case I rises. From this figure it will be observed that as a result of this lateral movement of the bellows head 25 the switch blade 66 is permitted to move out of engagement with the contact 65 and into engagement with the contact 64. In order to have the unit quite sensitive to temperature changes, the double bimetallic means 49—53 is provided, a rise in temperature causing the inner end of the member 53 to move to the right while the lower end of the other member 49 tends to move to the left. By virtue of this construction, the required movement necessary to change the switch blade 66 in one position to another is secured by a relatively small temperature change, five degrees in commercial practice.

When the pressure within the transformer case rises, which indicates a defective condition of the transformer, the pressure is communicated to the interior of the bellows 21 through the opening 36. This pressure causes the bellows 21 to expand, tending to move the head member 25 axially. However, since the adjusting member 77 would merely move along the lever 70 if moved axially, I provide means for transforming this axial movement into a movement which has a component in a lateral direction in order to operate the switch mechanism by causing the movement of the lever 70. To this end, I provide a member 90 adjustably fastened to the supporting plate 15 and provided with a laterally deflected cam end 92, best shown in Figure 1. This end lies alongside the switch lever 70 and in a position to be engaged by the actuating member 77 of the bellows head 25 when the latter is moved outwardly by the expansion of the bellows. Outward or axial movement of the head 25 causes the member 77 to engage the angular end 92 of the member 90, resulting in a lateral movement of the head 25 as the same is shifted. Figure 4 illustrates the position taken by the head as the result of expansion of the bellows 21, and from this figure it will be noted that not only has the head 25 been shifted outwardly but, in addition, it has been shifted laterally by virtue of the engagement of the member 77 with the cam end 92. Since the member 77 has been shifted laterally, the switch lever 70 follows the same and, as in the case of a temperature rise, the switch mechanism is actuated to cause the blade 66 to engage the contact 64.

The member 90 is adjustably secured to the plate 15 by means substantially the same as has been described above in connection with the attachment of the plate 15 to the supporting base bosses 16 and 17. Slots 96 and 97 are provided in the plate 15 and an apertured stud 98 is secured to the member 90 and extends through the slot 97. The member 98 receives a screw 100 having a double head portion received in a notch formed in a stud 101 carried at the upper end of the plate 15. Turning the screw 100 shifts the member 90 relative to the plate 15, the member 90 being guided in such adjusting movement by the stud 98 and a clamping screw 102 which is disposed in the slot 96 and threaded into the member 90 at the lower end thereof. When the proper adjustment of the member 90 is made, the screw 102 is tightened to retain such adjustment.

The switch mechanism 60 is preferably of the type adapted to be incorporated in a three-wire control circuit well known to those familiar with signaling systems of the indicating and recording type, and the switch mechanism 60 includes three leads, 105, 106 and 107. The contacts 64 and 65 are insulated from each other, the lead 106 being connected with contact 64 and lead 107 with contact 65, as indicated in Figures 1 and 3, respectively. The base section 12, cored at 13, is provided to receive the three leads or conductors, the outer end 109 of the base portion 12 being threaded to receive the usual conductor-protecting casing. All of the switch and switch operating parts are enclosed in a cover 110 secured in place by screws 111 or the like and sealed in leak-tight relation by a rubber gasket 112.

The mechanical linkage between the bellows and the switch proper is preferably composed of polished nickel silver and stainless steel parts, so as to insure proper action under all conditions. Pressure adjustments are made by adjusting the springs 30 and 31 on the screw-threaded studs 34 and by loosening the screw 102 and turning the screw 100, thereby shifting the position of the cam member relative to the supporting plate 15. Temperature adjustments may be secured by loosening the screw 87 and turning the screw 81 to shift the position of the supporting plate 15, carrying the operating arm 70 laterally relative to the base 5 and the bellows head 25.

Thus, by virtue of the above described construction, I provide means for operating a switch or other control unit in response to two conditions, specifically, pressure and temperature, acting entirely independently of one another. That is, if the temperature approaches but does not quite reach the critical point at which the switch mechanism 60 would normally be actuated, the subsequent occurrence of a pressure increase would expand the bellows 21 in the normal manner, but in order to operate the switch mechanism the expansion must continue to exactly the same point it would have to reach if the temperature was materially lower. Conversely, if the pressure is increased substantially to but not quite reaching the critical point at which the switch mechanism is actuated, a subsequent rise in temperature would have to reach the same point, in order to complete the actuation of the switch mechanism, that it would have to reach in case the pressure were materially lower. For example, as indicated in Figure 3, upon the occurrence of the temperature rise without the occurrence of any pressure increase, the member 77 merely moves away from the cam end 92. So far, then, as the pressure responsive means is concerned, there is a lost motion connection between the pressure responsive means and the movable part of the switch mechanism. Similarly, referring to Figure 4, should there occur a pressure increase without any temperature increase, the bellows head 25 tends to move axially, but by virtue of the cam end 92, the head is shifted laterally. This lateral movement, however, is not in any way influenced by the particular temperature of the transformer case, since in shifting the head 25 laterally, the lower ends of the bimetallic elements 49 and 53 are separated farther, or if they are already in contact, the tension therebetween is to a certain extent released. This, also, constitutes in effect a lost motion connection, particularly when considered in light of the movement of the member 77 along the switch operating arm 70. Thus, either the pressure or temperature responsive means may actuate the switch mechanism when the pressure or temperature reaches a critical point, determined by the setting of the various adjustments, while neither of the responsive means is effected by the position of the other in carrying out its appointed function.

While I have shown and described above the preferred construction in which the principles of the present invention have been embodied, it is to be understood that my invention is not to be limited to the particular details shown and described, but that, in fact, widely different means may be employed in the practice of the broader aspects of my invention.

What I claim, therefore, and desire to secure by Letters Patent is:

1. A control unit comprising a movable part, two separate means responsive, respectively, to two controlling conditions, a member acted upon by said two means and connected with said part to actuate the latter only when moved in one direction, one of said means acting in said one direction against said member and moving the same in that direction to actuate said part, the other means acting in another direction against said member and moving the same in said other direction, and means cooperating with said member when it is moved in said other direction for causing the member to have a component of movement in said one direction.

2. A control unit comprising a support, a member shiftably and pivotally mounted on said support, control means actuated by pivotal movement of said member, two separate responsive means arranged to act upon said member, one serving to swing said member about its pivot on said support and the other serving to shift said member relative to said support, and cam means associated therewith whereby said member is pivoted on said support whenever said other responsive means shifts the member relative to said support.

3. A control unit comprising a support, a pivoted member mounted on said support, control means actuated by said member, a part shiftably mounted with respect to said support at a point spaced from the axis of said pivoted member and shiftable along the latter when moved in one direction and adapted to provide for the movement of said pivoted member when moved in another direction, two separate responsive means operatively connected with said one part, one arranged to cause said part to tend to move along said pivoted member and the other being connected with said part to cause the same to move in said other direction, and means associated with said part for causing the same when moved by said one responsive means to have a component of movement in said other direction to provide for the pivotal movement of said pivoted member and the actuation of said control means.

4. A control unit comprising a support, a member movably mounted on said support, control means carried by said support and adapted to be actuated by said movable member, an expansible bellows carried by said support and including a shiftable head adapted to control the position of said movable member, and temperature responsive means connected with said movable head and adapted to act through said head independently of the pressure to which said bellows is subjected for also controlling the position of said movable member.

5. A pressure and temperature responsive device comprising a base member having an apertured nipple, a bellows mounted on said base member and having its interior in communication with the aperture in said nipple, a head carried by said bellows for movement with respect to said base member, temperature responsive means including a part disposed in the aperture of said nipple and connected with said head, the pressure within said bellows serving to shift the position of said head axially of said bellows and said temperature responsive means serving to shift the position of said bellows head laterally, and control means adapted to be actuated by either movement of said bellows head.

6. A pressure and temperature responsive device comprising a base member, a support carried thereby, pressure responsive means including a bellows carried by said base member and including a movable head disposed alongside said support, temperature responsive means also connected with said head and adapted to position the same laterally of the axis of said bellows, the pressure within the latter serving to position said head axially of the bellows, and control means carried by said support and actuated by movement of said head.

7. A pressure and temperature responsive device comprising a supporting base having an apertured nipple, a bellows mounted on said base and having its interior communicating with the opening in said nipple, a head movably carried on the outer end of said bellows, said head being movable in accordance with the pressure on the interior of said bellows communicated thereto through the opening in said nipple, temperature responsive means including a bar fixed to said head and pivotally mounted in said nipple, said temperature responsive means serving to position said head laterally, and switch means actuated by either axial or lateral movement of said head in response, respectively, to temperature and pressure conditions.

8. A pressure and temperature responsive device comprising a base member having an opening therein, a bellows secured to said base member over said opening and carrying a movable head, temperature responsive means including a bar pivoted to said base member and extending into said bellows and fixed to said head, said temperature responsive means acting through said pivoted member for shifting said head laterally independently of the pressure within said bellows, switch mechanism carried by said base member and including an arm adapted to be moved when said head is moved laterally by said temperature responsive means, and a cam member cooperating with said head for causing the same to shift laterally, to operate said switch mechanism, when said bellows is expanded axially.

9. A pressure and temperature responsive device comprising a base member having an opening therein, a bellows secured to said base member over said opening and carrying a movable head, temperature responsive means including a bar pivoted to said base member and extending into said bellows and fixed to said head, said temperature responsive means acting through said pivoted member for shifting said head laterally independently of the pressure within said bellows, switch mechanism carried by said base member and including an arm adapted to be moved when said head is moved laterally by said temperature responsive means, an adjustable member movably supported on said base member for movement with respect to said switch arm and having an inclined portion serving as a cam for deflecting said head laterally, to thereby cause actuation of said switch mechanism, whenever said bellows shifts said head axially, and means for adjusting the position of said adjustable member.

10. A pressure and temperature responsive device comprising a base member having an opening therein, a bellows secured to said base member over said opening and carrying a movable head, temperature responsive means including a bar pivoted to said base member and extending into said bellows and fixed to said head, said temperature responsive means acting through said pivoted member for shifting said head laterally independently of the pressure within said bellows, a supporting plate movably carried on said base member, means for adjusting the position of said supporting plate relative to said base member, switch mechanism mounted on said supporting plate and including an arm adapted to be moved when said head is moved laterally by said temperature responsive means, a contact element carried by said head adjacent said switch actuating arm and movable longitudinally of said arm when said bellows causes said head to move axially, and an adjustable member movably carried by said supporting plate for movement at substantially right angles to the direction of movement of said supporting plate and including an inclined portion serving as a cam against which said contact member acts when said bellows is expanded, said cam means serving to cause said head to shift laterally and thereby cause the actuation of said switch mechanism, independently of the position of said temperature responsive means.

11. An article of manufacture comprising a base member for a pressure and temperature responsive device, a bellows secured to said base member over an opening therein, a head member fixed to the outer end of said bellows, and temperature responsive means acting between said head member and said base member and including a part extending through the opening in said base member.

12. An article of manufacture comprising a base member having an apertured nipple extending therefrom at one side, a boss disposed on the other side of said base member, a bellows attached to said boss on the side of said base member opposite said nipple, a head sealed to the other end of said bellows and movable axially and laterally therewith, a bar fixed at its outer end to said head member and extending through said nipple and the interior of said bellows, and bimetallic temperature responsive means acting between said nipple and said bar for shifting said head laterally in response to temperature changes, said head being shifted axially of said bellows in response to pressure changes communicated to the interior of said bellows through said apertured nipple.

13. An article of manufacture comprising a base member having an apertured nipple extending therefrom at one side, a boss disposed on the other side of said base member, a bellows attached to said boss on the side of said base member opposite said nipple, a head sealed to the other end of said bellows and movable axially and laterally therewith, a slotted bar fixed at one end to said head and extending through the interior of said bellows and through said apertured nipple, a bimetallic strip fixed to said nipple, a second bimetallic strip secured to said bar, and a pivot pin carried by said base member and disposed in the slot in said bar, whereby said bimetallic strips act in response to temperature changes to swing said bar for shifting the position of said bellows head laterally, expansion of said bellows serving to shift said head and said bar axially and the slot in the latter accommodating movement thereof with respect to said pivot pin.

14. A unit adapted to respond to the temperature and pressure within a confined space, comprising means subjected to and adapted to be shifted by variations of the pressure in said space, and means responsive to the temperature in said space and connected to shift said first means independently of said pressure.

15. A pressure and temperature responsive device comprising a member having an apertured nipple, a bellows mounted on said member and having its interior in communication with the aperture in said nipple, said bellows being movable in response to pressure variations at said nipple, and temperature responsive means extending through the aperture of said nipple and connected with said bellows to shift the same.

16. A control unit comprising a support, a member movably mounted on said support, an expansible bellows carried by said support and including a shiftable head adapted to control the position of said movable member, and temperature responsive means connected with said movable head and adapted to act through said head independently of the pressure to which said bellows is subjected for also controlling the position of said movable member.

17. A pressure and temperature responsive device comprising a supporting base having an aperture, a bellows mounted at one end on said base over said aperture, a head movably carried on the other end of said bellows, said head being movable in accordance with the pressure on the interior of said bellows communicated thereto through said opening, and temperature responsive means including a bar fixed to said head and pivotally mounted in said opening, said temperature responsive means serving to position said head laterally.

18. A pressure and temperature responsive device comprising a supporting base having an aperture, a bellows mounted at one end on said base over said aperture, a head movably carried on the other end of said bellows, said head being movable axially in accordance with the pressure on the interior of said bellows communicated thereto through said opening, temperature responsive means including a bar fixed to said head and pivotally mounted in said opening, said temperature responsive means serving to position said head laterally, switch mechanism carried by said base and adapted to be actuated when said head is moved laterally by said temperature responsive means, and means cooperating with said head for causing the same to shift laterally, to operate said switch mechanism, when said bellows is shifted axially by variations in said pressure.

19. An article of manufacture comprising a base for a pressure and temperature responsive device, a member mounted for both pivotal and shifting movement on said base and extending through an opening therein, pressure responsive means connected to shift said member axially, and temperature responsive means connected to shift said member about its pivot on said base.

20. An article of manufacture comprising a base member having an apertured nipple extending therefrom at one side, a bellows attached at one end to the side of said base member opposite said nipple, a head sealed to the other end of said bellows and movable axially and laterally therewith, a bar fixed at its outer end to said head member and extending through said nipple and the interior of said bellows, and temperature responsive means acting between said nipple and said bar for shifting said head laterally in response to temperature changes, said head being shifted axially of said bellows in response to pressure changes communicated to the interior of said bellows through said apertured nipple.

21. An article of manufacture comprising a member having an aperture, a slotted bar extending therethrough, a pivot pin carried by said base and disposed in the slot in said bar, pressure responsive means acting to shift said bar axially on said pivot pin, and temperature responsive means connected with said bar to swing the same about said pivot pin.

22. A unit adapted to respond to the temperature and pressure within a confined space, comprising a member subjected on one side to variations of the pressure in said space and adapted to be shifted by said variations, means responsive to the temperature in said space and connected to shift said member independently of said pressure, and a device actuated by movement of said member.

23. A unit adapted to respond to the temperature and pressure within a confined space, comprising a member subjected to and adapted to be shifted by variations of the pressure in said space, said member carrying a part that extends into said space, and means responsive to the temperature in said space and connected with said part to shift said member independently of said pressure.

24. A unit adapted to respond to the temperature and pressure within a confined space, comprising means adapted to be shifted in one direction by an increase of the pressure in said space, and means responsive to an increase in the temperature in said space to shift said first means in said same direction independently of said pressure.

25. A pressure and temperature responsive device comprising a supporting member having an apertured nipple, a movable member carried by said supporting member, an expansible bellows carried by said supporting member with its interior in communication with the aperture in said nipple and including a shiftable head member, a part extending through said aperture and movable with said head member, said part controlling the position of said movable member, and temperature responsive means extending through said aperture and connected with said movable part for also controlling the position of said movable member.

26. A pressure and temperature responsive device comprising a supporting member having an apertured nipple, a movable member carried by said supporting member, an expansible bellows carried by said supporting member with its interior in communication with the aperture in said nipple and including a shiftable head member, a part extending through said aperture and movable with said head member axially in said nipple for controlling the position of said movable member, and temperature responsive means carried by said movable part and reacting against the nipple for shifting the movable member independently of movement thereof in response to pressure changes.

27. A pressure and temperature responsive device comprising a base member having an apertured nipple adapted to be inserted in an opening in a casing, an expansible bellows at one end of said nipple having a movable head subjected to and moved by pressure changes within the casing, a member connected with the head and movable axially of the bellows in response to pressure changes, a temperature responsive element connected to said movable member, and switch means arranged to be actuated by said temperature responsive member and by said movable member.

28. In a pressure and temperature responsive unit for transformer tanks and the like, the combination of a tubular mounting member adapted to have screw-threaded connection with an opening in the tank, a bellows extending substantially in alignment with said tubular mounting member and adapted to respond to the pressure in said tank, temperature responsive means disposed within said tubular mounting member and said bellows and comprising a bimetallic strip responsive to the temperature in said tank, and switch means adapted to be actuated by said bellows and by said temperature responsive means.

29. In a pressure and temperature responsive unit for transformer tanks and the like, the combination of a tubular mounting member adapted to have connection with an opening in the tank, a bellows carried by said mounting member and adapted to respond to the pressure in said tank, temperature responsive means disposed within said tubular mounting member and comprising a bimetallic strip responsive to the temperature in said tank, and switch means adapted to be actuated by said bellows and by said temperature responsive means.

JAMES R. HARRINGTON.